United States Patent
Fimognari

(10) Patent No.: US 12,060,013 B2
(45) Date of Patent: Aug. 13, 2024

(54) DEPLOYMENT DEVICE OF A CAMERA FOR A MOTOR-PROPELLED VEHICLE

(71) Applicant: U-Shin Italia S.p.A., Pianezza (IT)

(72) Inventor: Dario Fimognari, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 431 days.

(21) Appl. No.: 17/350,378

(22) Filed: Jun. 17, 2021

(65) Prior Publication Data

US 2021/0309162 A1 Oct. 7, 2021

Related U.S. Application Data

(63) Continuation of application No. PCT/EP2019/083350, filed on Dec. 2, 2019.

(30) Foreign Application Priority Data

Dec. 18, 2018 (EP) .................................. 18213636

(51) Int. Cl.
*B60R 11/04* (2006.01)
*G03B 11/04* (2021.01)
(Continued)

(52) U.S. Cl.
CPC ............ *B60R 11/04* (2013.01); *G03B 11/043* (2013.01); *H04N 23/51* (2023.01); *H04N 23/57* (2023.01);
(Continued)

(58) Field of Classification Search
CPC ............... B60R 11/04; B60R 2011/004; B60R 2011/005; B60R 2011/0092;
(Continued)

(56) References Cited

U.S. PATENT DOCUMENTS 4,887,109 A * 12/1989 Fujita ....................... G02B 7/10
396/377
8,243,137 B2 * 8/2012 Schuetz ................... E05B 81/78
348/148
(Continued)

FOREIGN PATENT DOCUMENTS

DE 102008012033 9/2009
DE 102010060573 5/2012
(Continued)

OTHER PUBLICATIONS

International Search Report for International Application PCT/EP2019/083350, mailed Jan. 20, 2020.
(Continued)

*Primary Examiner* — Antoinette T Spinks
(74) *Attorney, Agent, or Firm* — Burris Law, PLLC

(57) ABSTRACT

A device for a motor-propelled vehicle includes a camera mounted on a support. The camera is transposable from a retracted position to a capture position through a cover by an actuator. The cover is able to be displaced in both directions between a closed position and an open position. Simultaneously with the displacement of the camera, the cover is able to be split into two portions by a longitudinal displacement along an axis, perpendicular to the axis, of the portions. The camera is able to be displaced along an axis transverse with respect to the displacement of the portions.

16 Claims, 8 Drawing Sheets

(51) Int. Cl.
*H04N 23/51* (2023.01)
*H04N 23/57* (2023.01)
*B60R 11/00* (2006.01)

(52) U.S. Cl.
CPC ... *B60R 2011/004* (2013.01); *B60R 2011/005* (2013.01); *B60R 2011/0092* (2013.01); *B60R 2011/0094* (2013.01)

(58) Field of Classification Search
CPC ............ B60R 2011/0094; H04N 23/51; H04N 23/57; G03B 11/043
See application file for complete search history.

(56) References Cited

U.S. PATENT DOCUMENTS

| | | | | |
|---|---|---|---|---|
| 2009/0309971 | A1* | 12/2009 | Schuetz | B60R 11/04 |
| | | | | 292/201 |
| 2013/0294758 | A1* | 11/2013 | Barthel | B60R 11/04 |
| | | | | 396/428 |
| 2015/0343949 | A1 | 12/2015 | Portier et al. | |
| 2019/0241130 | A1* | 8/2019 | Wietkamp | B60R 11/04 |
| 2023/0017706 | A1* | 1/2023 | Carter | B60R 11/04 |
| 2024/0111205 | A1* | 4/2024 | Chou | G03B 17/02 |

FOREIGN PATENT DOCUMENTS

| | | |
|---|---|---|
| DE | 102016119433 | 4/2018 |
| JP | H09281577 | 10/1997 |
| JP | 2003063309 | 3/2003 |
| JP | 2011213193 | 10/2011 |
| WO | 2008022717 | 2/2008 |
| WO | 2011086132 | 7/2011 |

OTHER PUBLICATIONS

Office Action issued in corresponding JP Application 2021-534936, issued Sep. 19, 2023, and an English Translation, 12 pages.

* cited by examiner

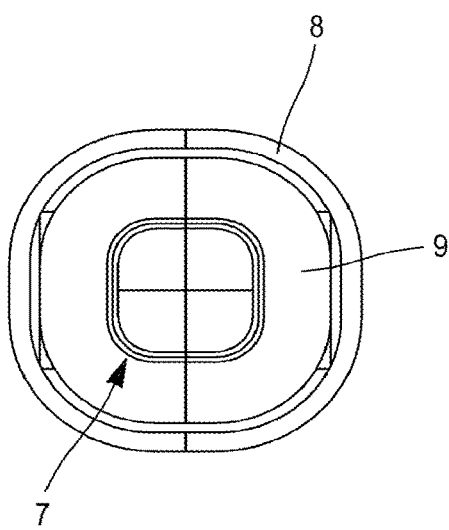
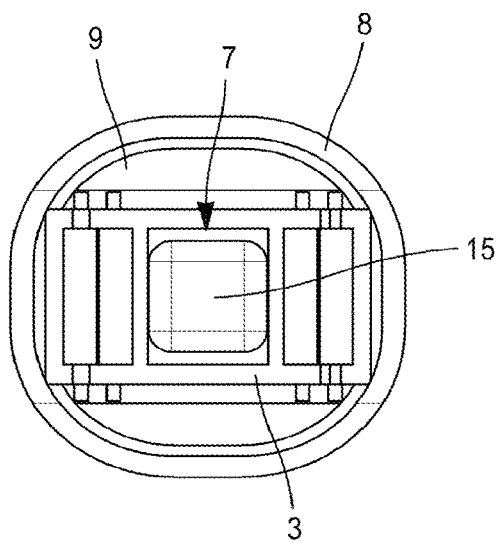
FIG. 5a  FIG. 5b
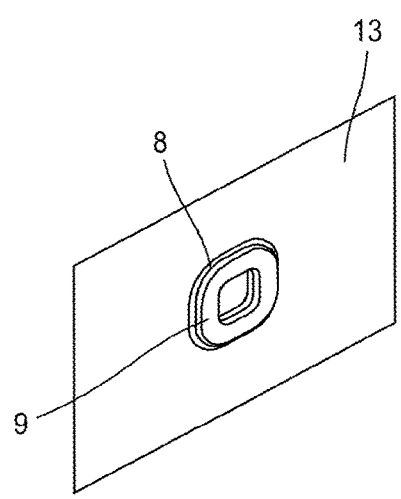
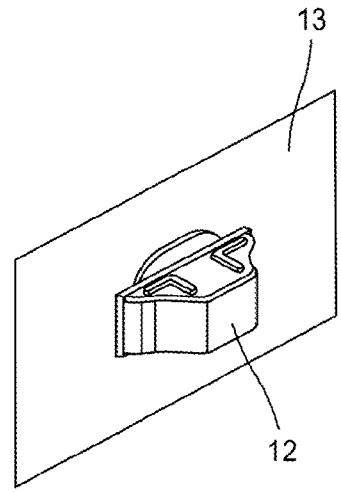
FIG. 6a  FIG. 6b

DEPLOYMENT DEVICE OF A CAMERA FOR A MOTOR-PROPELLED VEHICLE

CROSS-REFERENCE TO RELATED APPLICATIONS

This application is a continuation of International Application No. PCT/EP2019/083350, filed on Dec. 2, 2019, which claims priority to and the benefit of EP 18213636.6, filed on Dec. 18, 2018. The disclosures of the above applications are incorporated herein by reference.

FIELD

The present disclosure relates to a deployment device of a camera for a motor-propelled vehicle.

BACKGROUND

The statements in this section merely provide background information related to the present disclosure and may not constitute prior art.

The camera is disposed at the rear of the vehicle, for example at the level of the rear logo of the vehicle. Its deployment from a retracted position into a capture position is performed by an activator, for example the rear gear position of the vehicle. When in the capture position of the camera, said camera records the images of the external environment of the vehicle and transmits them back instantaneously on a screen disposed on the dashboard so that the driver is alerted on any danger subsequently to a maneuver of which the driver could not be aware with the conventional means of a vehicle, for example during a backward maneuver of the vehicle.

A deployment device of a camera for a motor-propelled vehicle is known in the prior art. A dual-purpose device for opening a latch during the actuation of a handle and, where necessary, for using a camera for capturing the exterior of the vehicle is known in EP 2054572. For an optimum implementation of these two tasks and for a barely bulky formation, it is proposed to form a hole in the rear wall in a handle receiving support shell to which the case of a module is fastened. In the case of the module, the camera is pivotally mounted via a camera support between a retracted position and an extended position and guided in translation. On the case of the module, there are also a reader and a transmission for a rotational translational movement of the camera.

Another device for a motor vehicle is known in EP 2524494, comprising a camera unit able to be brought in a rest position and an active position, and a protective element, which can be transferred in a closed position and in an open position, the camera unit being in the rest position and in an open position, the camera unit being in the rest position inaccessible from the outside behind the protective element when the protective element is in the closed position, and the camera unit is in the active position for image acquisition when the protective element is in the open position, and further comprising an arm for displacing the camera unit and the protective element. The camera unit and the protective element are movably hinged on each other on said device. These known devices of the prior art have drawbacks such as a reduced field of view of the camera because of the protective element located upstream of the camera. In addition, the camera is not optimally protected when in its rest position by the pivoting protective element. Indeed, when the vehicle is not locked, the pivoting protective element also serves as a handle, thus it is possible to access to the camera when a person makes the protective element, serving as a handle, pivot.

SUMMARY

This section provides a general summary of the disclosure and is not a comprehensive disclosure of its full scope or all of its features.

The present disclosure provides a device for a motor-propelled vehicle comprising a camera mounted on a support, said camera being transposable from a retracted position to a capture position through a cover by an actuator, characterized in that said cover is able to be displaced in both directions between a closed position and an open position, simultaneously with the displacement of said camera, said cover being able to be split into two portions and by a longitudinal displacement along a first axis X, perpendicular to a second axis Y, of said portions, said camera being able to be displaced along said second axis Y transverse with respect to the displacement of said portions.

In some forms, the transposition from a retracted position to a capture position of the camera is performed by means of levers. Still in one form, the displacement of the cover from the closed position to the open position is done by means of levers. This allows transmitting the movement of the camera to the cover.

In some forms, the levers are connected to each other via said support by fastening means, and ideally, the fastening means consist of rods able to be inserted into recesses passing through the support. In another variation, the levers are connected to the cover by fastening means and ideally, the fastening means consist of rods able to be inserted into recesses passing through the cover. This allows effectively transmitting the movement of the camera to the cover.

In one form, the fastening means are able to be displaced according to a determined track and ideally, the track is L-shaped. This shaping enables a translational displacement of the fastening means.

In another form, the cover is split into two portions at its middle when it switches from a closed position into an open position. This improves the shift of the cover portions.

In one form, the contact end of one of the portions of the cover has a V-shape and the other contact end of the other portion of the cover has a shape complementary to the V-shape such that the two ends of the portions nest into each other when in the closed position of said cover. Furthermore, docking of the two portions is promoted.

In one form, the displacement of the device is performed by an activator such as the rear gear position of a vehicle or an activation button. The advantage being a control from the passenger compartment of the vehicle.

In another form, the camera is transposed from the retracted position to the capture position by a translational movement able to make the camera pass through a vehicle logo orifice, and still in another form, the cover is coincident with a vehicle logo and able to be split into two portions in order to enable the camera to switch from the retracted position into the capture position simultaneously with the split-up into two portions.

In one form, a gasket is interposed between the device and a vehicle logo, the gasket resting on a planar surface of a metal sheet belonging to a rear door leaf of the vehicle. This improves sealing.

Still in another form, the camera is able to be inclined according to a vertical axis Y and preset according to a transverse axis Z with respect to the displacement of the camera via a setting device. This allows adapting to the different heights of vehicles, without impacting visibility.

Still in yet another form, the actuator comprises a motor mounted on an axis, said axis comprising a first toothed wheel located at the end opposite to that receiving said motor, able to drive at least one second toothed wheel, said at least one second toothed wheel is able to drive an actuation lever, said actuation lever being connected to the support via a lug disposed on said support and able to be inserted into an oblong hole of said actuation lever, enabling the displacement of the camera from a retracted position to a capture position and vice versa, said lug being also inserted into a recess of the receptacle according to the direction of displacement of said camera.

The longitudinal displacement of the two portions of the cover during its opening enables the camera to be simultaneously displaced toward its capture position without reducing its field of view, the portions of the cover being no longer visible from outside the vehicle when in their open positions. When in the closed position of the cover, the latter serves as an antitheft. This shaping aims at improving the protection of the camera when in its retracted position.

Each arrangement of the actuator has its own advantage depending on the type of vehicle equipped with such a device. Also, the device may be used for a camera-equipped rear-view mirror type application.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5a is a view of a front face of a portion of the device, in accordance with the teachings of the present disclosure;

FIG. 5b is a view a rear face of the device of FIG. 5a, in accordance with the teachings of the present disclosure;

FIG. 6a is a perspective view of a portion of the device visible from outside the vehicle, in accordance with the teachings of the present disclosure;

FIG. 6b is a perspective view of a back of the device of FIG. 6a, without the actuator, in accordance with the teachings of the present disclosure;

Figure 1:
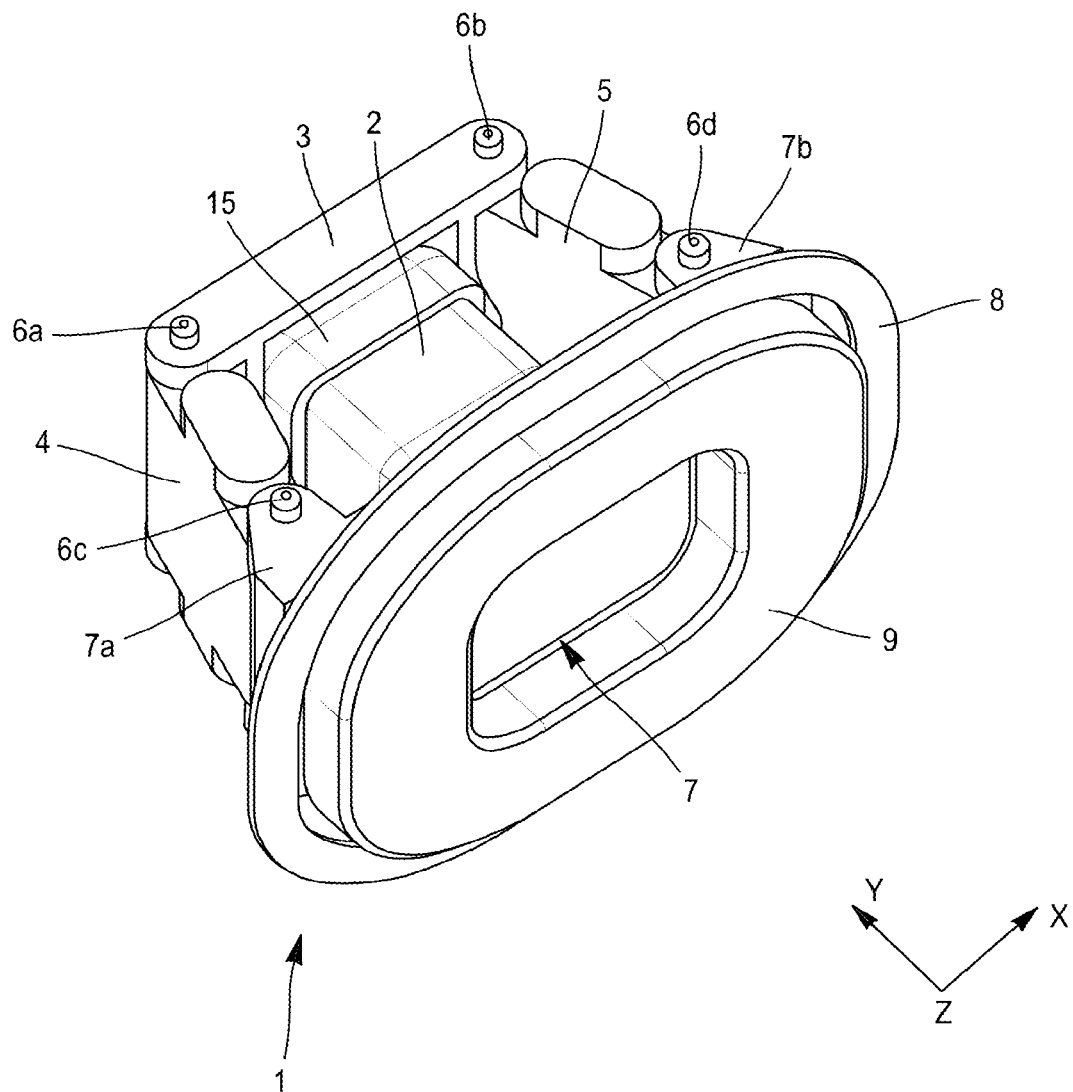
FIG. 1 represents a perspective top view of a device, without an actuator, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the description of the following variations and forms do not in any way limit the scope of the present disclosure, that is to say that the combinations or the simple modifications of the forms disclosed hereinafter are also covered by the scope of the present disclosure.

FIG. 1 shows the device 1 comprising a camera 2 mounted on a support 3 in its retracted position. Said camera 2 is also inserted into a square-shaped secondary support 15 having a central cavity enabling the insertion of a randomly-shaped, camera 2. In one example, the randomly-shaped camera 2 may include a cubic shaped camera. A third support (not represented) is inserted into the support 3 via a square-shaped recess adapted to receive the third support. The secondary support 15, which is inserted into the third support, and the third support, enables an inclination of the camera 2 before mounting of the device 1. The inclination of the camera 2 allows adapting its field of view to the vehicle to which the device 1 is integrated.

Indeed, depending on the vehicle type, the inclination and presetting of the camera 2 will not be the same because of the difference in height of each vehicle and vehicle architecture. Thus, the inclination and presetting of the camera 2 adapted according to the vehicle enables the driver to benefit from an improved field of view of the exterior of the vehicle. Two levers 4 and 5 are connected to the support 3 by fastening means 6a and 6b. The lever 4 is connected by one of its ends to one of the ends of the support 3 by the fastening means 6a passing through a recess thus connecting the two parts 3 and 4. The lever 5 is connected by one of its ends to the other end of the support 3 by the fastening means 6b passing through a recess thus connecting the two parts 3 and 5. A cover 7 is split into two portions 7a and 7b. When in the closed position of the cover, the portions 7a and 7b are complementary and nest into each other by theirs ends and form one single portion 7. The lever 4 is connected at the other one of its ends to the portion 7a of the cover 7 by the fastening means 6c passing through a recess thus connecting the two parts 4 and 7*a* and the lever 5 is connected at the other one of its ends to the portion 7*b* of the cover 7 by the fastening means 6*d* passing through a recess thus connecting the two parts 5 and 7*b*.

Figure 2A:
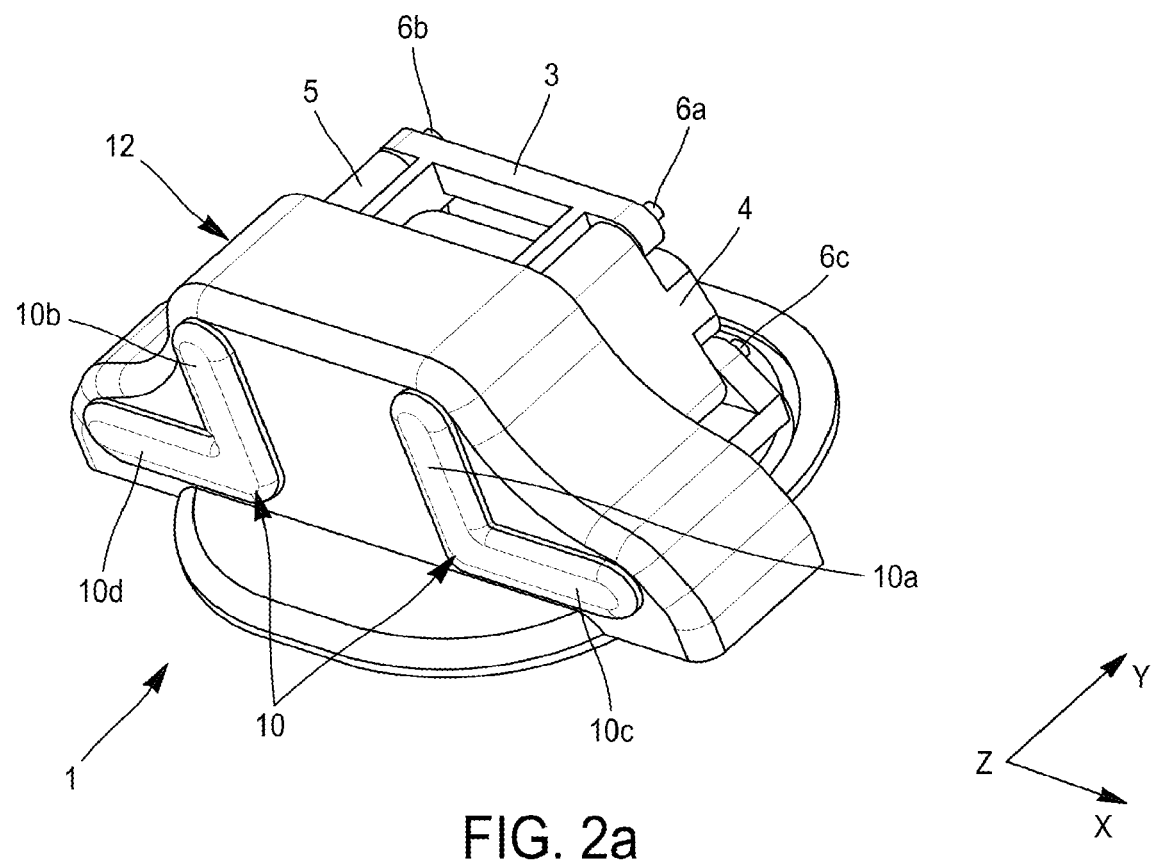
FIG. 2a represents a perspective bottom view of the device, without the actuator, in accordance with the teachings of the present disclosure.
Figure 2B:
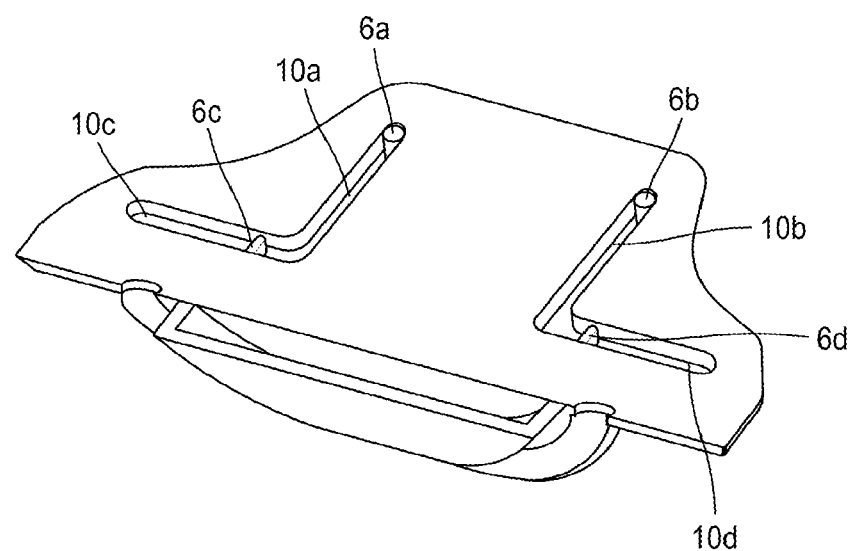
FIG. 2b represents a sectional view of a plurality of tracks of FIG. 2a, without the actuator, in accordance with the teachings of the present disclosure.

These fastening means 6 will be able to be displaced according to a plurality of determined tracks 10 in the form of cavities as presented in FIGS. 2*a* and 2*b*. Said fastening means 6*a* and 6*b* consist of rods able to be inserted into recesses passing through said support 3 and said fastening means 6*c* and 6*d* consist of rods able to be inserted into recesses passing through said cover 7. A gasket 8 made of polyurethane, or of another material having a sealing function, is inserted between the metal sheet (not represented) of the vehicle and a receptacle 12 so as to enhance the sealing and the mechanical strength of the device 1.

FIG. 2*a* shows the lower face of the device 1 and the tracks 10 that each fastening means 6 end follows during the activation of the device 1. The fastening means 6*a* and 6*b* respectively follow the tracks 10*a* and 10*b* whereas the fastening means 6*c* and 6*d* respectively follow the tracks 10*c* and 10*d*. The tracks 10*a* and 10*b* are respectively perpendicular with respect to the tracks 10*c* and 10*d*. The fastening means 6*a* and 6*b* abut respectively in the tracks 10*a* and 10*b* at their upper end when in the retracted position of the camera and are displaced during the deployment of the camera to its capture position until abutting at the lower end of the tracks 10*a* and 10*b*. The fastening means 6*c* and 6*d* do not abut respectively on the tracks 10*c* and 10*d* when in the retracted position of the camera as represented in FIG. 2*b* to keep an angle smaller than 90° between the cover and the levers 4 and 5 in order to fluidify the opening of the cover during the activation of the device.

However, when in the capture position of the camera, the fastening means 6*c* and 6*d* abut respectively away from one another on the tracks 10*c* and 10*d*. Both of the tracks 10*a* and 10*c* as well as the tracks 10*b* and 10*d* have an L-shape forming a cavity for receiving the ends of the appropriate fastening means 6 and guiding them. It should be understood that the shape of said tracks is an L-shape in any geometric direction.

FIG. 2*b* shows a cross-sectional view of the tracks 10*a* to 10*d*. Said tracks forming a cavity in a receptacle 12. Said cavities receive the fastening means 6 enabling the displacement of the camera 2 and of the cover 7 via the levers 4 and 5 not represented in this figure. In more details, one of the ends of the fastening means 6*a* and 6*b* is imbricated respectively into the tracks 10*a* and 10*b* and one of the ends of the fastening means 6*c* and 6*d* is imbricated respectively into the tracks 10*c* and 10*d*. The fastening means 6*a* and 6*b* are displaced respectively in the cavities of the tracks 10*a* and 10*b* according to a translational movement, parallel to the movement of the camera 2 and the fastening means 6*c* and 6*d* are displaced respectively in the cavities of the tracks 10*c* and 10*d* according to a translational movement, perpendicular to the movement of the camera 2 and parallel to the movement of the cover 7. The cavities have a specific depth enabling insertion of the ends of the fastening means as well as a width sufficient for receiving the ends of the fastening means having a determined size while tolerating the displacement of the ends of the fastening means in these cavities.

It should be noted that there is a symmetry with respect to the longitudinal plane and to the transverse plane of each L-shaped track.

Figure 3:
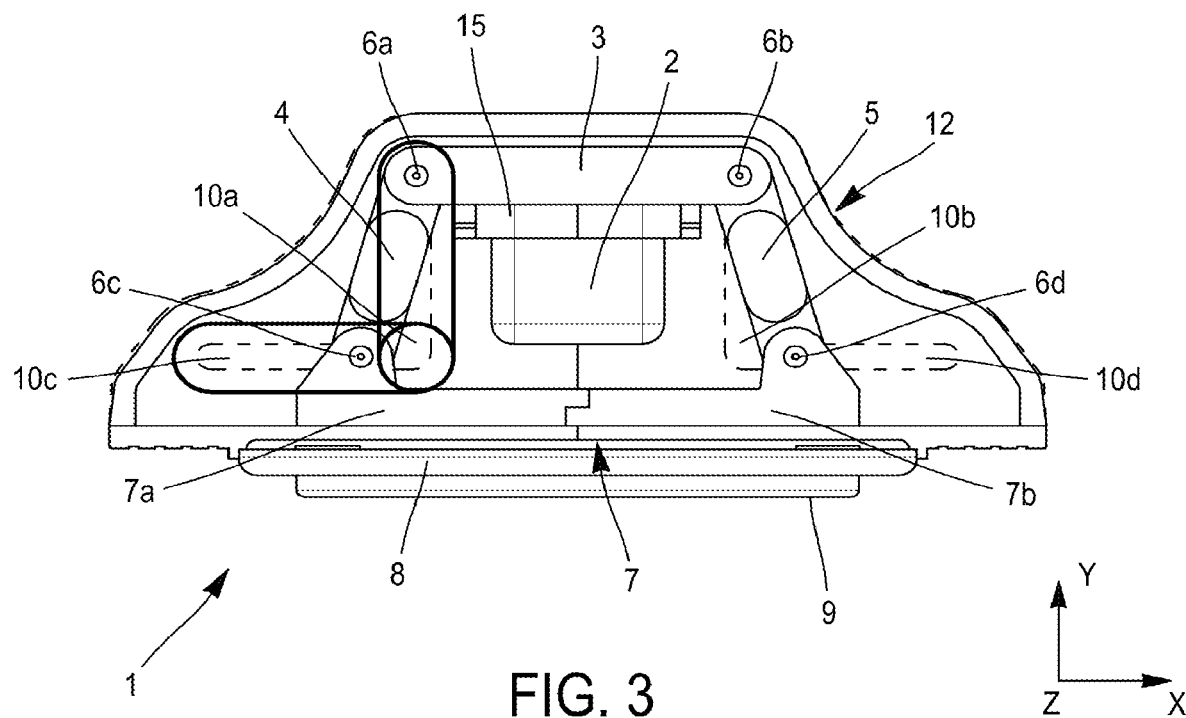
FIG. 3 represents a sectional view of the device of FIG. 1, without the actuator, in accordance with the teachings of the present disclosure.

FIG. 3 shows a section of the device 1 in which are represented a camera 2 mounted on its support 3, the levers 4 and 5 as well as the cover 7 and the fastening means 6*a* to 6*d*. During the activation of the device 1, the camera 2 is displaced from a retracted position to a capture position simultaneously with the cover 7 from a closed position to an open position. The translational displacement of the fastening means 6*a* and 6*b* along the tracks 10*a* and 10*b* causes the transposition of the camera 2 according to the Y axis whereas simultaneously, the fastening means 6*c* and 6*d* are displaced in translation along the tracks 10*c* and 10*d* causing the longitudinal displacement of the portions 7*a* and 7*b* of the cover 7 and therefore the opening of the cover 7 according to the X axis. The camera 2 in the capture position, passes through the opening created by the cover as well as the gasket 8 made of polyurethane, or of another material having a sealing function, the metal sheet 13 of the vehicle and the logo 9 in order to capture the images located outside of the vehicle.

During the retraction of the camera 2 into its retracted position according to the Z axis, the fastening means 6*a* and 6*b* return into their initial position as represented in FIG. 3 by following the same tracks 10*a* and 10*b* whereas, simultaneously, the fastening means 6*c* and 6*d* also return into their initial position as represented in this same figure by following the same tracks 10*c* and 10*d* thus causing the displacement into the closed position of the portions 7*a* and 7*b* of the cover 7 according to the X axis.

When in the inactive position of the device 1, the portions 7*a* and 7*b* form a single cover 7 such that the closed position has a function 11 of antitheft and of protection of the camera 2 against elements such as dust, water or ice thanks to the complementarity of the ends of the portions 7*a* and 7*b*. In one variant of the present disclosure, the device 1 is located at the rear of the vehicle and more particularly at the center of the logo 9 of said vehicle, such that the cover 7 opens at the level of the center of said logo 9 and therefore the camera 2 is transposed from its retracted position to its capture position by a translational movement able to make said camera 2 pass through an orifice of said vehicle logo 9.

In another variant of the present disclosure, said logo 9 is coincident with the cover 7 and able to be split into two portions in order to enable the camera 2 to switch from the retracted position into the capture position simultaneously with the split-up into two portions.

Figure 4:
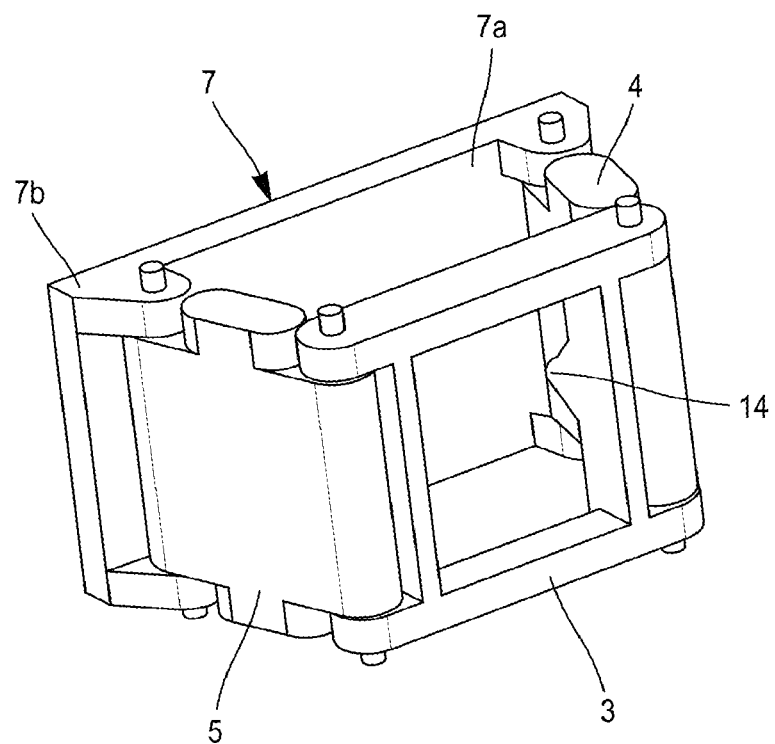
FIG. 4 represents a perspective view of a portion of the device of FIG. 1, in accordance with the teachings of the present disclosure.

FIG. 4 shows a portion of the device 1 in which there is represented the support 3 receiving the camera (not represented) via the secondary support (not represented), and the third support (not represented), the cover 7 as well as the levers 4 and 5 connecting the support 3 and the cover 7 using fastening means 6.

The device 1 being in its retracted position, the cover 7 is in the closed position and the portion of the device 1 is trapezoid-shaped. The square-shaped recess of the support 3 allows imbricating the third support using fastening supports 14 located on either side on the internal faces of the vertical branches of the support 3. The recess, allowing imbricating the third support, which in turn supports the camera 2 and the secondary support 15, is centered on the cover 7, by the trapezoid-shape of this portion of the device 1, which induces a transposition of the camera 2 at the middle of the cover 7 during its opening by the split-up of the portions 7*a* and 7*b* of said cover 7.

The levers 4 and 5 have a cross-like shape, whose portions connected to the support 3 and to each portion 7*a* and 7*b* of the cover 7 have a recess receiving the fastening means 6 and having a length longer than the other portions of said levers 4 and 5.

FIG. 5*a* shows the cover 7 as well as the gasket 8 made of polyurethane, or of another material having a sealing function, and the logo 9 of the device 1 may be a square, a circle, a triangle, a rectangle, a lozenge, etc. . . . . . Opening of the cover 7 by the split-up of the portions 7*a* and 7*b* is performed at its middle as illustrated in this figure. The gasket 8 made of polyurethane, or of another material having a sealing function, is fastened between the metal sheet (not represented) and the receptacle 12. This gasket 8 is disposed around said logo 9. The orifice of the logo 9 of the vehicle is centered on the middle of the cover 7 so as to let the camera pass during the activation of the device 1 by opening of the cover 7 and through the orifice of the receptacle 12, the metal sheet 13 and the logo 9 because, as explained in FIG. 4, the camera is centered on the cover 7.

FIG. 5*b* shows a back view of FIG. 5*a*. The third support of the camera is imbricated into the support 3 and centered on the cover 7 as well as the orifice of the logo 9. The portion of the device 1 illustrated in FIG. 4 does not extend beyond the gasket 8 when in the retracted position of the camera.

FIG. 6*a* shows the portion of the device 1 visible from outside the vehicle. The metal sheet 13 of the door leaf such as for example the trunk or a hatchback of a vehicle is followed by a gasket 8 made of polyurethane, or of another material having a sealing function and then by the logo 9, the gasket 8 protecting the device 1 by enhanced sealing and mechanical strength which could be altered between the metal sheet 13 and the logo 9 of the vehicle in case of absence of said gasket 8. When in the capture position of the camera, the camera passes, by transposition, through the cover 7 during its opening as well as the orifice of the logo 9 so as to obtain an optimum field of view of the external environment of the vehicle in one variation.

FIG. 6*b* shows a back view of the device of FIG. 6*a*. A receptacle 12 comprising the device 1 is fastened to the metal sheet 13 of the vehicle. The receptacle 12 aims at protecting the device 1 and also at forming the tracks 10 by the formation of cavities in this receptacle 12 aiming at receiving the fastening means 6. In this figure, only the tracks of the upper face of the receptacle 12 are shown, it should be understood that the same tracks are present on the lower face of said receptacle 12 that is to say that there is a symmetry with respect to the longitudinal plane and to the transverse plane of each L-shaped track. The receptacle 12 extends beyond the gasket made of polyurethane, or of another material having a sealing function, for receiving the portions of the cover when in its open position. Hence, the receptacle 12 has the shape of the parts assembled inside this receptacle 12, thus allowing limiting the space covered by the device inside the vehicle.

Figure 7:
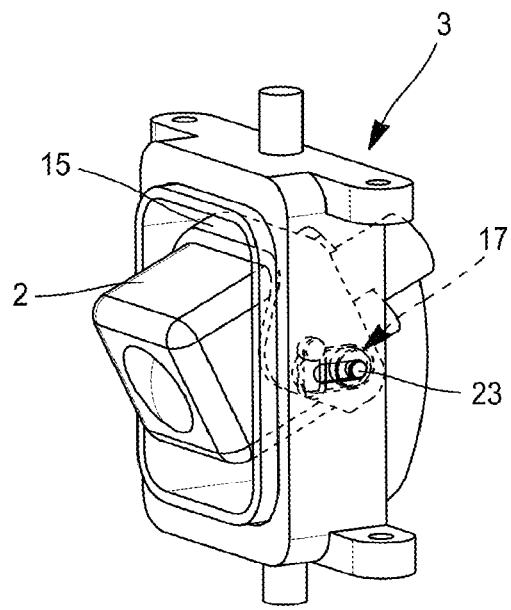
FIG. 7 is a view of a camera on its support, in accordance with the teachings of the present disclosure.

FIG. 7 shows the camera 2 mounted on its secondary support 15, which in turn is mounted on the third support, which is mounted on the support 3. On the support 3 there is present a device 17 for setting the inclination of the camera 2 according to a perpendicular axis (X) with respect to the axis of displacement of the camera 2 from its retracted position to its capture position. The camera 2 may be pre-inclined with an angle of inclination determined according to the type of vehicle equipped with the device 1 of the present disclosure. Indeed, the third support enables to move the camera 2 according to a transverse axis (Z) and the second support 15 enables to move the camera 2 according to a vertical axis (Y). The support 15 can also rotate around (X) axis. Setting of the inclination of the camera 2 is performed before the final mounting of the camera 2 in the device 1. Indeed, a setting lug 23 is disposed on the secondary support 15 and extending through a lateral branch of the support 3 in order to manually set the inclination of the camera 2. The setting lug 23 can be displaced according to a transverse axis (Z) parallel to the direction of displacement of the camera 2 from its rest position to its capture position by a recess created through the lateral branch of the support 3. It is also possible to motorize the setting of the camera for more flexibility of the user from the passenger compartment of the vehicle.

Figure 8:
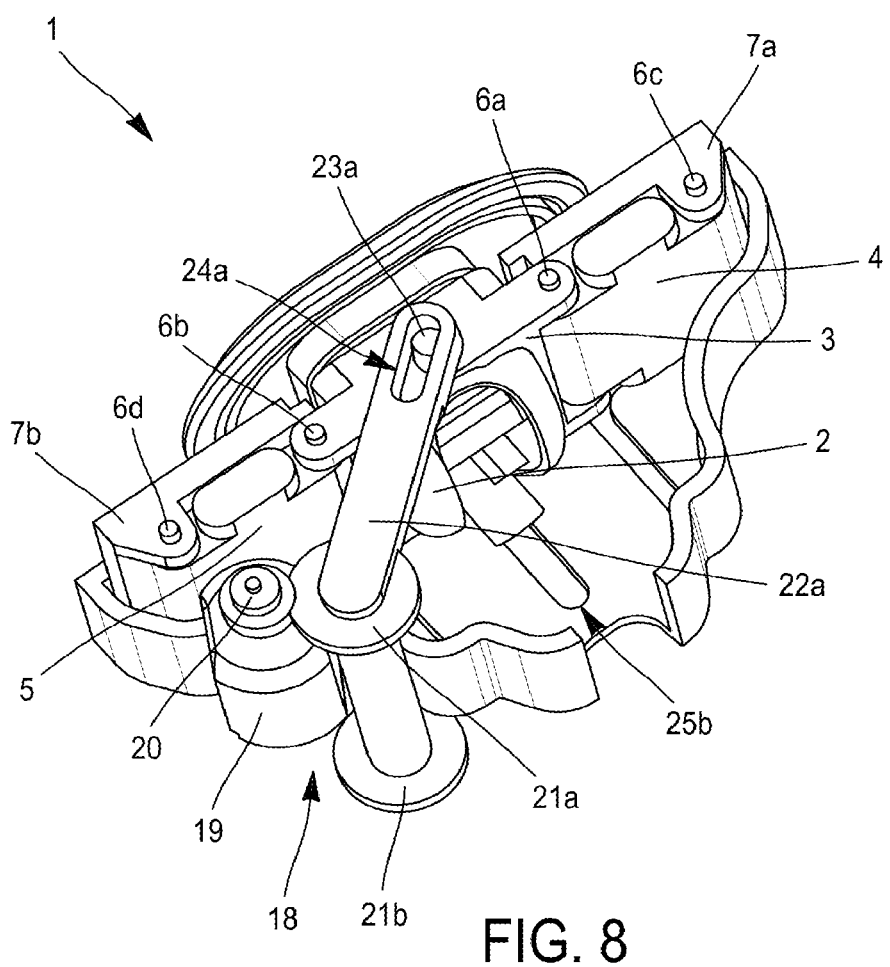
FIG. 8 is a top view of the device, in accordance with the teachings of the present disclosure.

FIG. 8 shows a schematic upper view of the device 1 when the camera 2 is in the capture position. In this figure, there can be seen a motor 19 connected by an axis 25 to a first toothed wheel 20 (the teeth are not represented) which, in turn, is in contact with a second toothed wheel 21*a* (the teeth are not represented) which supports an actuation lever 22*a*. The actuation lever 22*a* is connected to the support 3 via a lug 23*a* disposed above the support 3 and which can be inserted into an oblong hole 24*a* disposed at the level of the end opposite to the end connected to the second toothed wheel 21*a*. In this figure, the lug 23*a* is disposed above the support 3 at its middle. A lug 23*b* is also located on the face opposite to that represented in this figure, that is to say on the bottom of the support 3.

Indeed, the actuation levers of the camera 2 are symmetrical with respect to a plane parallel to that which cuts in two halves the rod supporting the toothed wheels 21*a* and 21*b*, and perpendicular to said rod. The actuator 18 has the same second toothed wheel 21*b* at the side opposite to the second toothed wheel 21*a* in contact with the first toothed wheel 20 and therefore another actuation lever 22*b* is connected in the same manner to the second toothed wheel 21*b* which is at the opposite of the second toothed wheel 21*a* in contact with the first toothed wheel 20. This other actuation lever 22*b* is connected in the same manner to the support 3 but this time via a lug 23*b* located below the support 3.

The receptacle 12 has two recesses able to receive each corresponding lug 23*a*, 23*b* of the support 3, so as to displace the camera 2 from the retracted position to the capture position and vice versa, when the actuator 18 is activated. These two recesses are disposed according to an axis parallel to the axis of displacement of the camera 2.

Figure 9:
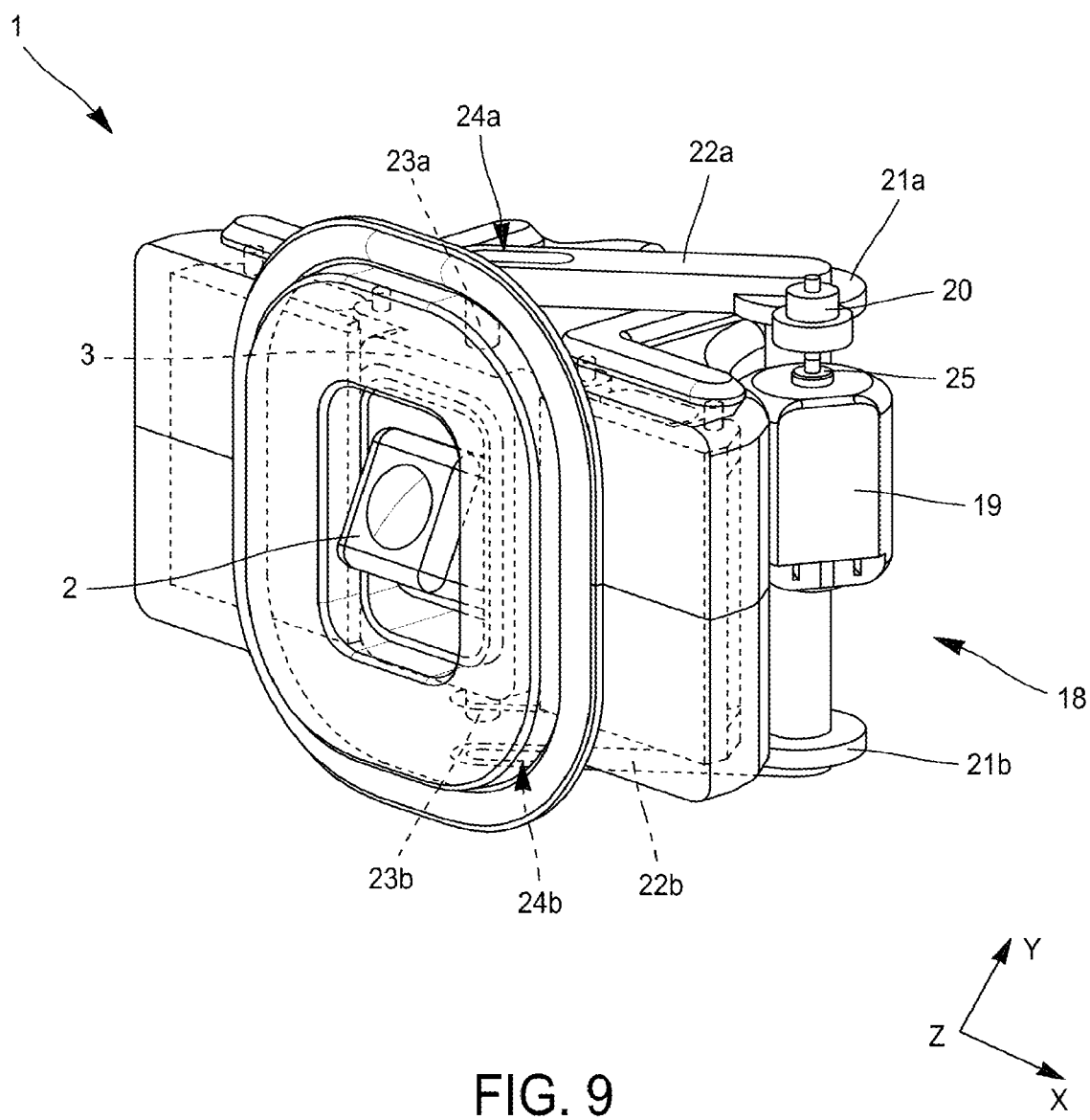
FIG. 9 is a perspective view of the device, integrating an actuator, in accordance with the teachings of the present disclosure.

FIG. 9 shows a perspective view of the device 1 in the same state as in FIG. 8. There can be seen a motor 19 connected to a first toothed wheel 20 via an axis 25. This figure aims at showing the symmetry of the actuator 18. Indeed, there can be seen the two second toothed wheels 21*a* and 21*b* each connected to an actuation lever 22*a*, 22*b*. Each actuation lever 22*a*, 22*b* has an oblong hole, respectively 24*a*, 24*b* where a corresponding lug 23*a*, 23*b* is inserted into its corresponding oblong hole 24*a*, 24*b*.

The actuator 18 is inserted into a submodule (not represented) fastened on the receptacle 12.

Figure 10A:
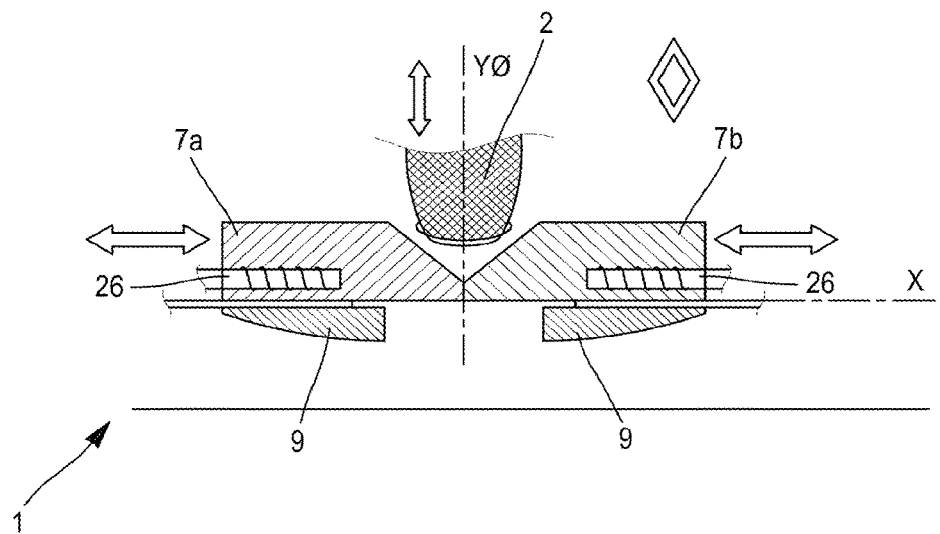
FIG. 10a is a schematic perspective top view of a second form of the device, in accordance with the teachings of the present disclosure.

FIG. 10*a* is a schematic view of another form of the present disclosure in which the contact surfaces of the ends of the portions 7*a* and 7*b* of the cover 7 are parallel and join each other on the same plane.

In this form, there are no levers 4 and 5. The camera 2, being displaced according to the Z axis during the actuation of the device 1, pushes the two portions 7*a* and 7*b* of the cover 7 in order to engage the opening of said portions 7*a* and 7*b* of said cover 7. The displacement of the portions 7*a* and 7*b* of the cover 7 by the camera 2 is possible by the shaping of the cover 7. Indeed, the funnel shaping, where the opening of the funnel starts at the upper portion of the cover 7 at the level of the axis of displacement of the camera 2, thus enables the camera 2, during its displacement from the retracted position to the capture position, to come into contact with the walls of the funnel and thus push the portions 7*a* and 7*b* of the cover 7 toward their opening position.

During the displacement from the capture position to the retracted position of the camera 2, the resilient means 26 disposed in the portions 7a and 7b of the cover 7 enable the displacement from the open position to the closed position of the portions 7a and 7b of the cover 7 by their biasing function. Indeed, when in the open position of the portions 7a and 7b of the cover 7, the resilient means 26 are compressed against the internal portion of the receptacle 12. Thus, during the displacement of the camera 2 in its retracted position, the resilient means 26 are released until recovering their initial rest position and therefore the cover 7 returns to the closed position.

Figure 10B:
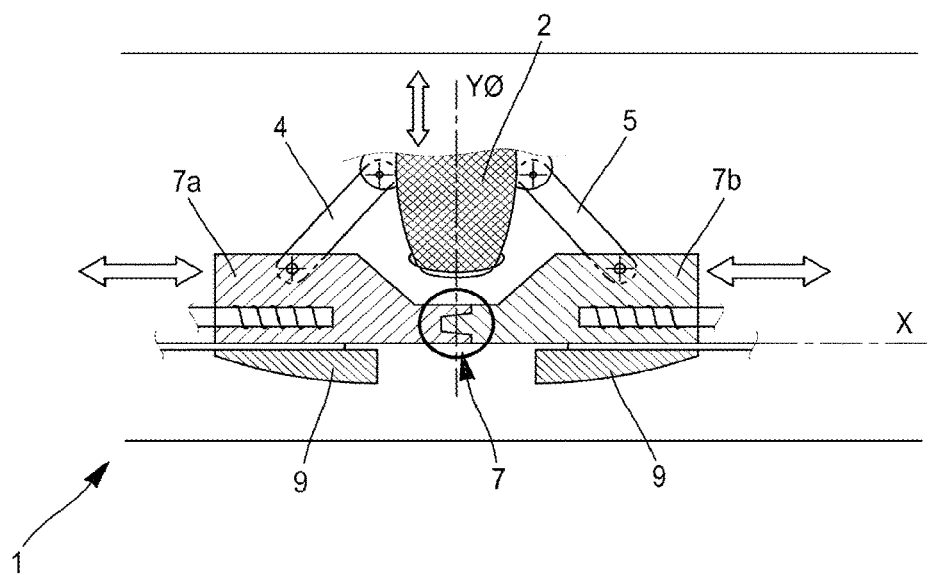
FIG. 10b is a schematic perspective top view of a third form of the device, in accordance with the teachings of the present disclosure.

FIG. 10b is another form of the present disclosure in which a difference with the previous variation lies in that one of the portions of the cover 7 has its contact end V-shaped and the other portion of the cover 7 has its contact end with a shape complementary to the V-shape of the end of the other portion of the cover 7. Thus, the two ends of the portions 7a and 7b nest into each other when in the closed position of the cover 7. This shaping aims at improving the protection of the camera 2 when in its retracted position by the antitheft and protective function against elements such as dust, water or ice provided by this shaping. In this form, the levers 4 and 5 are present. The device 1 is actuated in the same manner as that presented in FIG. 10a. One of the portions of the cover 7 may also have its contact end in another shape, such as an L-shape or a U-shape.

Figure 10C:
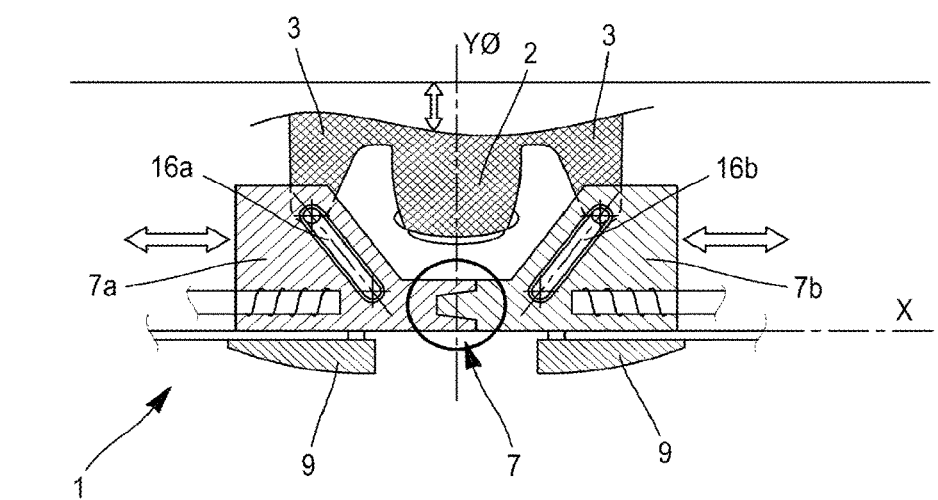
FIG. 10c is a schematic perspective top view of a fourth form of the device, in accordance with the teachings of the present disclosure.

FIG. 10c is another form of the present disclosure in which the support 3 of the camera 2 is no longer indirectly connected to the cover 7 via the levers 4 and 5 but is directly connected by a vertical extension of the ends of the support 3 to the cover 7 by two tracks 16a and 16b inclined toward the opening point of the cover 7. The first track 16a connects an end of the support 3 to the portion 7a of the cover 7 by a fastening means 6a and the second track 16b connects the other end of the support 3 to the portion 7b of the cover 7 by a fastening means 6b. The device is actuated in the same manner as that presented in FIG. 10a. During the actuation of the device 1, each of the ends of the fastening means 6a and 6b follows its track 16a and 16b, thereby simultaneously enabling the displacement of the camera 2 from the retracted position to the capture position and the displacement of the cover 7 from the closed position to the open position.

During the return of the camera 2 from the capture position back to the retracted position, the fastening means 6a and 6b return in their initial position as represented in this figure by the tracks 16a and 16b, thus causing the closure of the cover 7.

Figure 11:
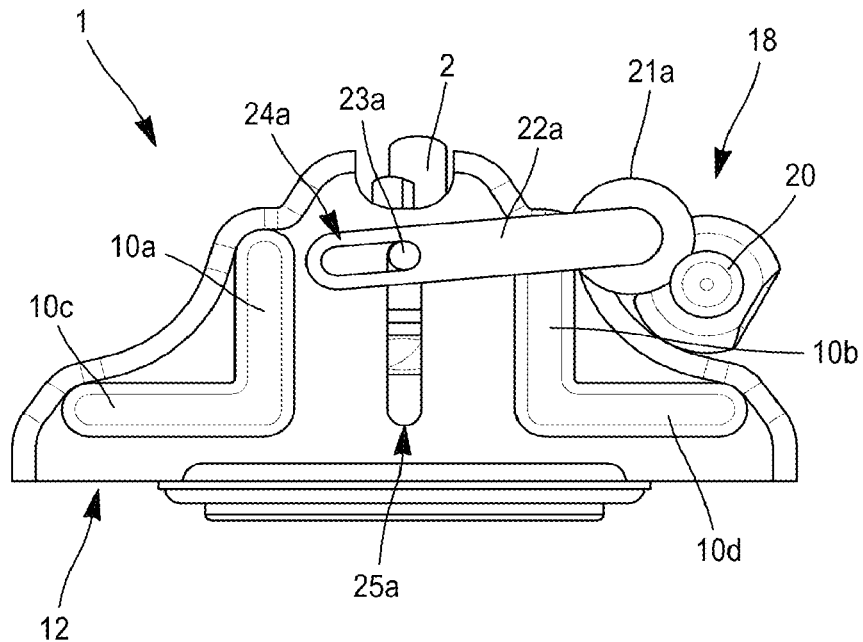
FIG. 11 is a top view of the device, when in the retracted position of the camera, in accordance with the teachings of the present disclosure; and, FIG. 12 is a top view of the device, when in the capture position of the camera, in accordance with the teachings of the present disclosure.
Figure 12:
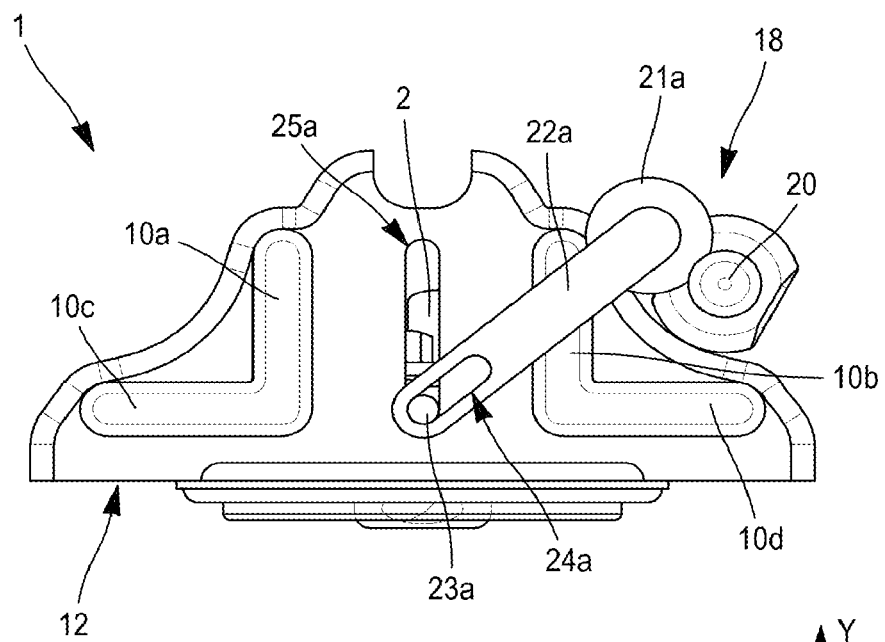

In the next paragraphs, the operation of the actuator 18 is detailed using FIGS. 11 and 12. When the motor 19 is activated, for example during the activation of the reverse gear of a motor vehicle, the motor 19 makes the first toothed wheel 20 (the teeth are not represented) turn in the clockwise direction via an axis 25. Then, the first toothed wheel 20, in movement and in contact with a second toothed wheel 21a (the teeth are not represented), drives this second toothed wheel 21a in movement in the counterclockwise direction, which also drives the other second toothed wheel 21b in a same movement. Hence, each second toothed wheel 21a and 21b drives each corresponding actuation lever 22a, 22b in a rotary movement along the track of each recess provided in the receptacle 12 able to receive the corresponding lug 23a, 23b disposed on the support 3 which, in turn, can be inserted into each oblong hole 24a, 24b of each corresponding actuation lever 22a, 22b. When in the retracted position of the camera 2, each lug 23a, 23b is disposed in each oblong hole 24a, 24b at the level the closest to the corresponding second toothed wheel 21a, 21b as represented in FIG. 11.

Each lug 23a, 23b is also located in each corresponding recess of the receptacle 12 at the level opposite to the cover 7 as represented in FIG. 11. During the displacement of the camera 2 up to its capture position, each lug 23a, 23b is simultaneously displaced through each corresponding oblong hole 24a, 24b but also through each corresponding recess of the receptacle 12 until simultaneously abutting against the oblong hole 24a, 24b and against the corresponding recess as represented in FIG. 12.

During the displacement of the camera 2 from its capture position back to its retracted position, each lug 23a, 23b returns in its initial position as represented in FIG. 10, by the counterclockwise movement of the first toothed wheel 20 and the clockwise movement of the two second toothed wheels 21a and 21b.

In some forms of the present disclosure including the levers 4 and 5, these levers 4 and 5 are set in movement by the actuator 18 according to a rotary movement.

Of course, the directions of rotation may be reversed.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for a motor-propelled vehicle, the device comprising:
a camera mounted on a support, said camera being transposable from a retracted position to a capture position through a cover by an actuator, wherein said cover is configured to be displaced between a closed position and an open position, simultaneously with a displacement of said camera, said cover configured to be split into two portions by a longitudinal displacement along a first axis, perpendicular to a second axis, of said two portions, said camera configured to be displaced along said second axis transverse with respect to the longitudinal displacement of said two portions.

2. The device according to claim 1, wherein a transposition from the retracted position to the capture position of said camera is performed by levers.

3. The device according to claim 2, wherein the longitudinal displacement of said cover from the closed position to the open position is performed by said levers.

4. The device according to claim 3, wherein said levers are connected to said cover by fastening means.

5. The device according to claim 2, wherein said levers are connected to each other via said support by a fastening means.

6. The device claim 5, wherein said fastening means are configured to be displaced according to a determined track.

7. The device according to claim 6, wherein said determined track is L-shaped.

8. The device according to claim 5, wherein said fastening means includes rods configured to be inserted into recesses passing through said support, and said fastening means comprises the rods inserted into the recesses passing through said cover.

9. The device according to claim 1, wherein said cover is split into the two portions at a middle of said cover when said cover is displaced from the closed position into the open position.

10. The device according to claim 1, wherein a first contact end of a first portion of the two portions of said cover has a V-shape and a second contact end of a second portion of the two portions of said cover has a shape complementary to the V-shape such that the first and second contact ends of said portions are configured to nest into each other when in the closed position of said cover.

11. The device according to claim 1, wherein a displacement of said device is performed by an activator comprising a rear gear position of a vehicle or an activation button.

12. The device according to claim 1, wherein said camera is transposed from the retracted position to the capture position by a translational movement configured to allow said camera pass through a vehicle logo orifice.

13. The device according to claim 1, wherein said cover is coincident with a vehicle logo and is configured to be split into two portions in order to enable the camera to switch from the retracted position into the capture position simultaneously with said cover being split-up into the two portions.

14. The device according to claim 1, wherein a gasket is interposed between said device and a vehicle logo, said gasket resting on a planar surface of a metal sheet belonging to a rear door leaf of said motor-propelled vehicle.

15. The device according to claim 1, wherein said camera is configured to be inclined according to a perpendicular axis with respect to the displacement of said camera via a setting device.

16. The device according to claim 1, wherein said actuator comprises a motor mounted on an axis, said axis being connected to a first toothed wheel located at an end opposite to an end receiving said motor, the motor configured to drive at least one second toothed wheel, said at least one second toothed wheel configured to drive an actuation lever, said actuation lever being connected to said support via a lug disposed on said support and configured to be inserted into an oblong hole of said actuation lever, enabling the displacement of said camera from the retracted position to the capture position and vice versa, said lug further configured to slide in a recess of a receptacle according to a direction of the displacement of said camera.

* * * * *